Figure 1:
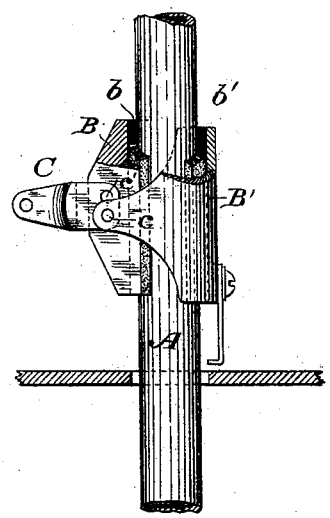

(No Model.)

T. E. ADAMS.
ELECTRIC ARC LAMP.

No. 555,841. Patented Mar. 3, 1896.

WITNESSES:
Lucy A. Bailey.
Frank H. McNary

INVENTOR,
Thomas E. Adams
BY Wm A. Sinkle
ATTORNEY.

UNITED STATES PATENT OFFICE.

THOMAS E. ADAMS, OF CLEVELAND, OHIO, ASSIGNOR TO THE ADAMS-BAGNALL ELECTRIC COMPANY, OF SAME PLACE.

ELECTRIC-ARC LAMP.

SPECIFICATION forming part of Letters Patent No. 555,841, dated March 3, 1896.

Application filed June 6, 1895. Serial No. 551,826. (No model.)

*To all whom it may concern:*

Be it known that I, THOMAS E. ADAMS, a citizen of the United States, residing at Cleveland, in the county of Cuyahoga and State of Ohio, have invented a new and useful Improvement in Clutches for Arc Lamps, of which the following is a specification that will enable those skilled in the art to which my invention pertains to make and use the same.

My improvement relates to the contact or gripping surfaces of friction-clutches for electric-arc lamps. Its objects are to provide clutching-surfaces of a character that will not be affected by humidity, corrosion, or the depositions of gases or oil; that will remove such depositions if formed from the object to be clutched, keeping its surface bright and clean, and that will therefore always be in condition to instantly clutch or release the object, responding quickly and accurately to all requirements.

It consists of lining or facing the clamping or gripping members of a clutch with graphite, preferably in solid blocks, which are suitably attached to said members and shaped to fit upon the diametrically-opposite surfaces of the object to be clamped.

My improvement is particularly designed for use in mechanisms where lubrication of the frictional contact-faces is difficult or undesirable and where these surfaces should be kept clean and free from sticky or rough depositions in order that the action of the clutch should be positive and unvarying. It is applicable to and particularly useful in electric-arc lamps in which the rods that carry the moving carbon sticks are held by clutches which release their hold at frequent intervals to permit the minute step-by-step feed of the carbon as required at the arc or point of combustion.

The continuity and steadiness of an arc light is absolutely dependent upon the promptness and accuracy of this feeding mechanism, for failure to respond quickly leaves the carbon points too far apart, while too great a movement of the carbon will bring the points together and close the arc, either of these conditions being detrimental to the light.

Many of the metallic clutches now in general use in arc lamps will operate reasonably well when all the parts are clean and bright, but become defective and irregular in action when the parts become corroded through exposure to the elements or coated by depositions from impurities in the atmosphere or by the gases and fumes arising from the combustion at the arc immediately below them.

I have found that by the use of graphite in the frictional contact-surfaces of clutches the coating of the parts to an injurious extent is prevented, such deposits having no detrimental effect on the graphite surface, which will prevent permanent deposits upon or remove them from a metallic surface to which it is opposed.

The prevention of permanent injurious deposits or coatings upon metal surfaces opposed to the graphite surfaces of clutches is due to the fact that the minute pores and indentations in the surface of the metal soon become filled with a fine graphite dust or powder which is rubbed off from the opposing graphite block and into the interstices of the metal, which is thus kept smooth and bright by the action of the graphite shoe. Any deposit which might form upon the clear surface of the metal is largely prevented from close adhesion thereto by this underfilling of graphite powder, which is constantly being renewed by the graphite block. For these reasons my improvement is particularly valuable in mechanisms the proper performance of whose functions is dependent upon the delicacy and accuracy of the operations of clutches or brakes.

Figure 2:
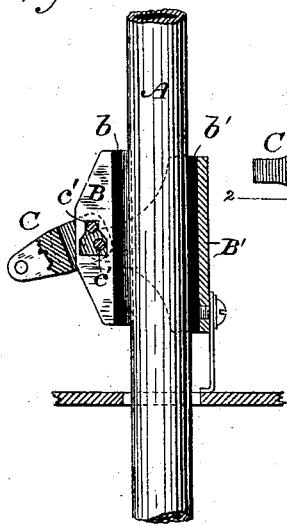
Figure 3:
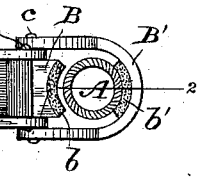

In the accompanying drawings, Figure 1 shows a well-known form of clutch mechanism employed in electric-arc lamps for controlling the carbon-rod, with the gripping-faces of the clutch lined or faced with graphite blocks in accordance with my invention, the clutch members being in holding contact with the rod, some of the parts being broken away for purposes of better illustration. Fig. 2 is a sectional view of the same on the line 2 2 of Fig. 3 and shows the clutch members having released the rod. Fig. 3 is a plan or top view of the same, showing the parts in the same position as in Fig. 2.

The rod A, which carries the movable carbon in an arc lamp, is held between the members B B' of a clutch, said members being connected by pivots $c$ and $c'$ to a lever C, the free end of which is rocked up and down by suitable mechanism in the lamp to cause it to force the clutch members into contact with or to release the rod A, as required.

The members B B' are lined or faced with graphite blocks $b\ b'$, which come into contact with and clamp upon the rod A. These blocks are attached to the members in any suitable manner.

Having thus described my invention, what I claim as new and useful, and desire to secure by Letters Patent, is—

In an electric-arc lamp, the combination with the carbon-rod and a clutch having jaws disposed at diametrically-opposite sides of said carbon-rod, of graphite facings on said jaws, said graphite facings being thus adapted to receive the carbon-rod between them and engage the same at diametrically-opposite points, substantially as set forth.

In testimony whereof I affix my signature, in the presence of two witnesses, this 4th day of June, 1895, at Cleveland, Ohio.

THOMAS E. ADAMS.

Witnesses:
A. E. WEINBERG,
R. L. HOLMES.